Oct. 15, 1963  M. SKOBEL  3,106,748
PROCESS AND APPARATUS FOR MAKING SUPPORTED SLEEVING
Filed May 23, 1960  3 Sheets-Sheet 3
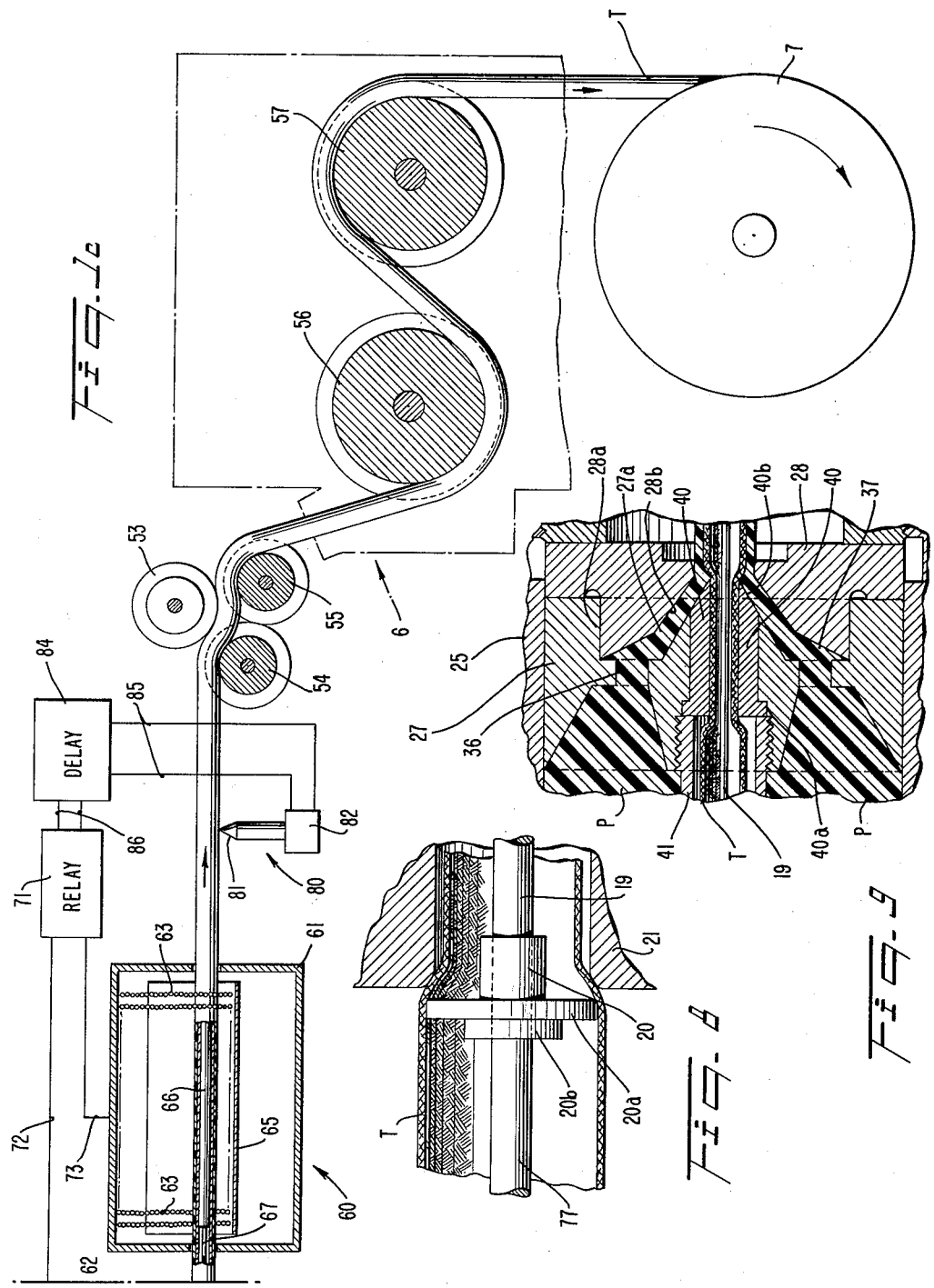

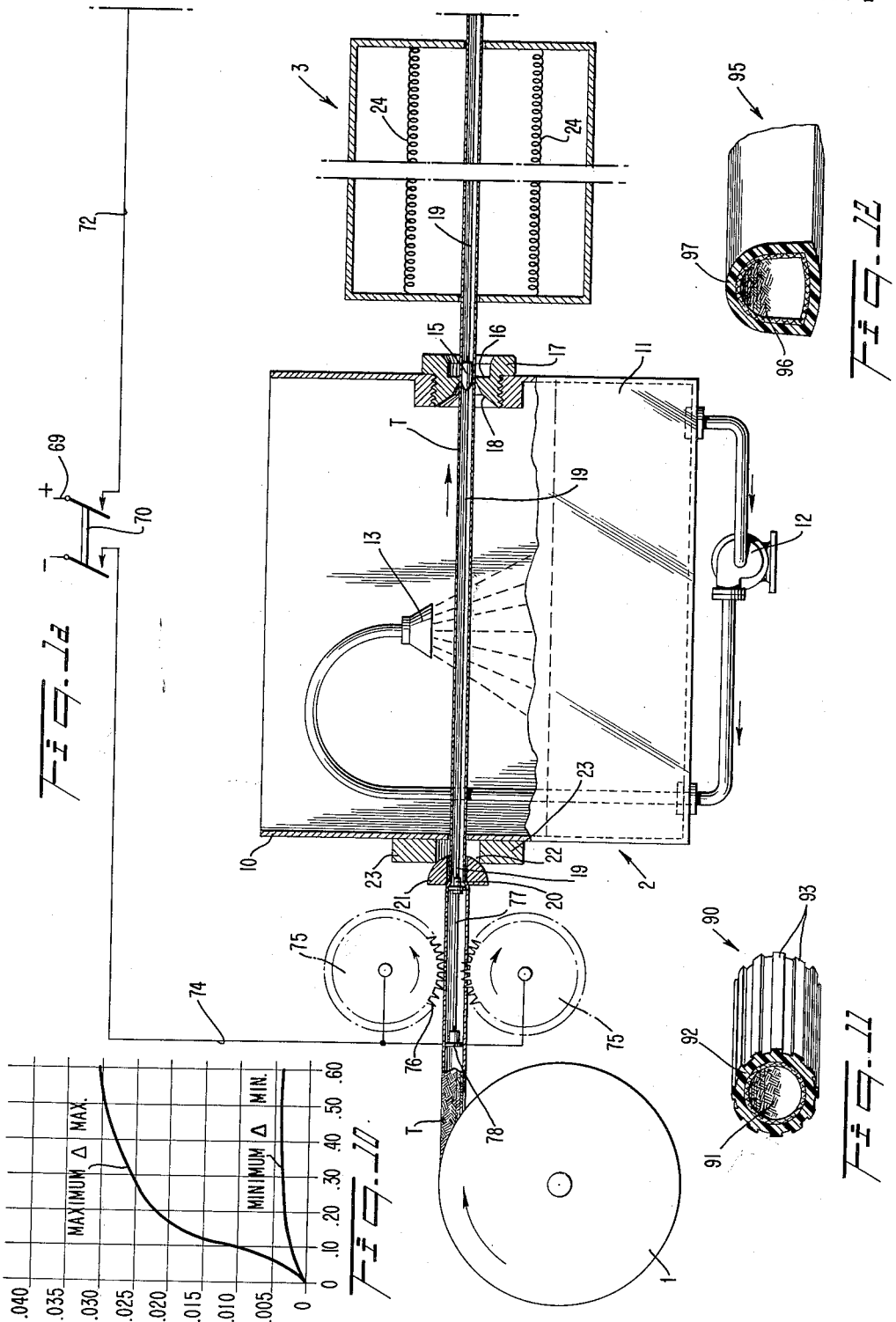

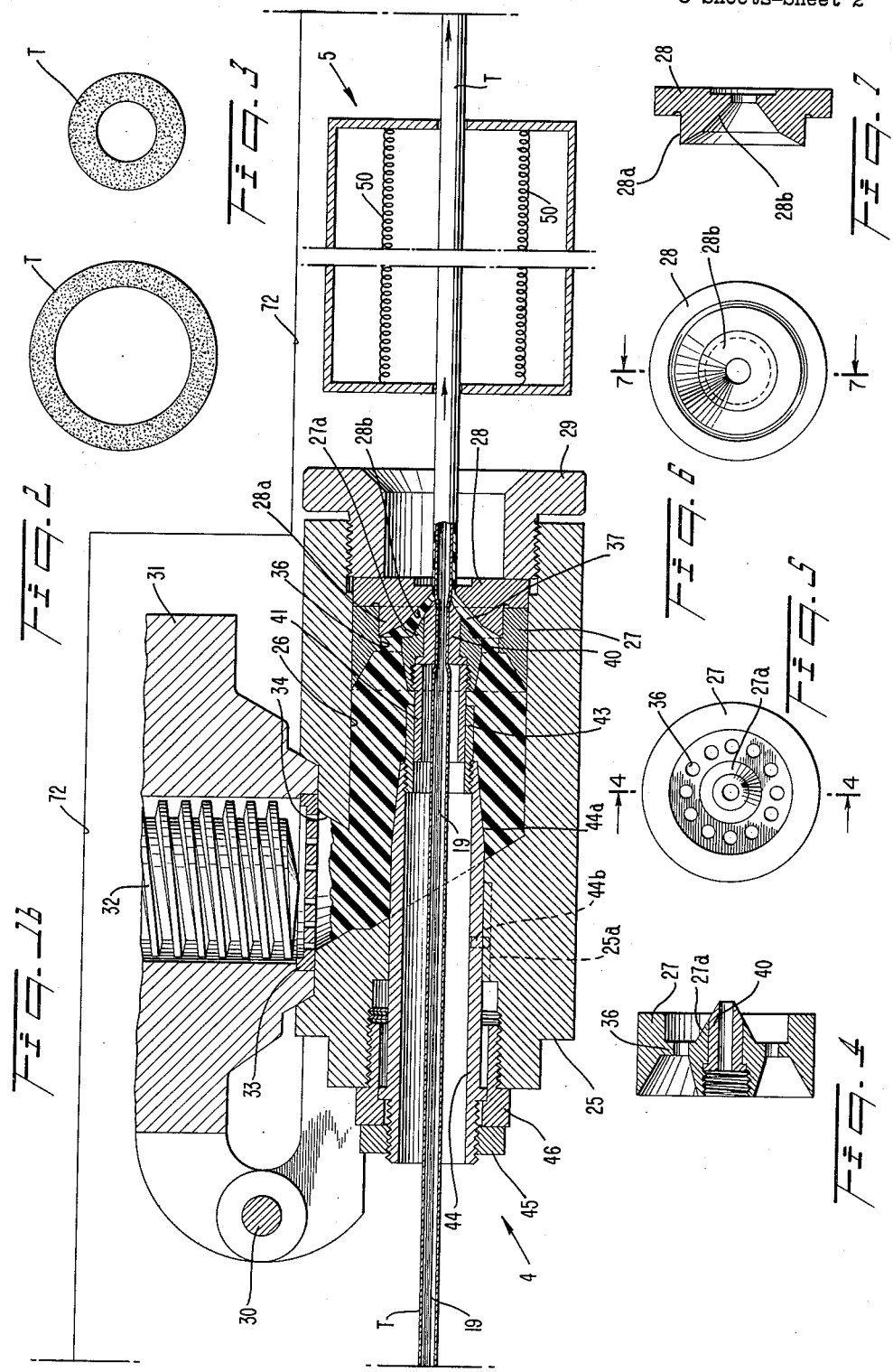

United States Patent Office 3,106,748
Patented Oct. 15, 1963

3,106,748
PROCESS AND APPARATUS FOR MAKING SUPPORTED SLEEVING
Max Skobel, 233 Pinewood Ave., Elberon, N.J.
Filed May 23, 1960, Ser. No. 30,987
10 Claims. (Cl. 18—13)

This is a continuation-in-part of my prior application Serial No. 776,379, filed November 25, 1958, now Patent No. 3,045,281. The invention relates to electrical insulation tubing or continuous flexible tubing and particularly an improved process and apparatus for applying a covering or coating of plastic material onto an inner tube or sleeve which is so flexible and supple as to be not self supporting.

According to present practice, plastic coatings are applied to fabric flexible tubes by a dipping process in which the tube is usually advanced longitudinally through a bath. This process has the disadvantage that the bath of plastic material contains a large proportion of solvents or other liquids which must be removed in a subsequent curing process and tend to produce porosity in the coating. The thickness of the coating is limited to the amount that will adhere to the tubing as it comes out of the bath. If a thicker covering is desired a plurality of successive dipping operations are required. Moreover, it is not possible to control satisfactorily the cross-sectional shape of the finished tube or the thickness and uniformity of the tube wall.

Extruding apparatus for applying a plastic coating to tubing using an internal die are known but these have a serious disadvantage. In this type of apparatus the pressure of the sleeving or tubing against the internal die due to the pressure of the rubber being extruded onto the sleeving causes the sleeving to bind on the die making it virtually impossible to retain the die in the tubing and results in damages to the sleeving or tubing.

In accordance with the invention a plastic covering is applied to a supple inner tube by extrusion. The term plastic being herein used in a generic sense to include natural and synthetic resins, polymers, elastomers and other materials which are capable of being extruded in a plastic condition and thereafter are cured or set to provide an inert flexible and durable material.

The invention is particularly applicable to covering a fabric tube with synthetic rubber, for example silicone rubber, or with a plastic material, for example, polyethylene, Teflon or nylon. The fabric tube is preferably braided but may, if desired, be knitted, woven or felted of mineral fiber such as glass or asbestos, animal fiber such as silk or wool, vegetable fiber such as cotton or ramie or synthetic fiber such as nylon and rayon. As the inner tube is not sufficiently self supporting to withstand the pressure of the plastic material being extruded onto it, a feature of the invention is that the tube is compacted and rigidified at a zone immediately ahead of a zone where extrusion is effected.

Another feature of the invention is that it provides for continuously testing the completed tube electrically by means of an electrode inside the tube and another electrode outside the tube. A novel feature of the apparatus in accordance with the invention is that it provides for holding the inner test electrode in place and also provides means for constricting the tube prior to extrusion. The process and method in accordance with the invention make it possible to produce reinforced or "supported" tubing or sleeving rapidly and economically. Such sleeving is particularly suitable for use as an insulation of an electrical conduit or conductor by reason of its uniform wall thickness and constant electrical properties.

The nature, characteristics and advantages of the invention will be more fully understood from the following description and claims and from the accompanying drawings in which:

FIGS. 1a, 1b and 1c are together a schematic view partially in vertical section and partially in side elevation illustrating the process of the invention and apparatus for carrying out the process;

FIG. 2 is a cross section of the supple fabric tube or sleeving prior to constriction in an extruder according to the invention and is illustrative of the disposition or density of the fibers therein;

FIG. 3 is a cross section of the supple tube when constricted in preparation for extruding a covering thereon and is illustrative of the compacting of the tube fibers that takes place in the extruder according to the invention;

FIG. 4 is a vertical section of a guider member taken along 4—4 of FIG. 5;

FIG. 5 is a front elevation view of the guider of FIG. 4;

FIG. 6 is an elevation view of a die of an extruder according to the invention;

FIG. 7 is a vertical section of the die of FIG. 6 taken along line 7—7 of FIG. 6;

FIG. 8 is an enlarged view corresponding to a portion of FIG. 1b, but showing a modification;

FIG. 9 is an enlarged detail view corresponding to a portion of FIG. 1b and is illustrative of a die for constricting the sleeving prior to extruding a rubber thereon;

FIG. 10 is a diagram or chart illustrating the preferred dimensioning of the die member of FIG. 9 according to sleeving dimensions on which it operates for one form of sleeving which may be used with the present invention;

FIGS. 11 and 12 are cross sectional perspective views of supported tubes in accordance with the invention.

In carrying out the process of making a reinforced or "supported" tube in accordance with the invention a fabric tube or sleeving T is formed by any suitable process for example, by weaving, knitting or braiding. A braided tube of glass fibers is shown by way of example in the drawings. As the tube is formed it is wound up on a suitable supply reel 1. From the supply reel 1 the tube T is drawn in a stretched condition (FIGS. 1a, 1b and 1c) through an adhesive applicator 2, an oven 3, an extruder 4, and a curing chamber 5 by a capstan 6 or other suitable drive mechanism. As the tube T passes through the applicator an adhesive is applied to the tube. The adhesive is dried in the oven 3. At the extruder 4, a layer of coating or plastic P is extruded onto the tube. The plastic covering is cured or set in the chamber 5. From the capstan 6 the tube passes to a take-up mechanism having a take-up reel 7.

The applicator (FIG. 1a) comprises a container 10 containing a low viscosity adhesive 11 which is pumped under pressure by a pump 12 to a head 13 and flowed as a stream onto the tube T. At a point beyond that at which the adhesive is applied the tubing is passed over an internal mandrel 15 which is disposed coaxial with an aperture 16 of a wiper die 17. The mandrel opens up the tube and wiper 17, has the aperture 16 dimensioned so as to remove the excess adhesive from the outside of the tubing T. The excess adhesive flows back along conical surfaces 18 of the wiper into the container 10.

The mandrel 15 has an elongated stem portion 19 that extends in a direction opposite to the direction of movement of the tube T. At a point in advance of the container 10, the stem 19 is provided with a shoulder or head portion 20 which has a diameter approximately equal to or slightly greater than the normal internal diameter of the fabric tube T. An annular abutment member 21 is disposed just behind the head 20 and has a central hole which is slightly smaller in diameter than the head. The forward face of the abutment member 21 is flat and meets the central hole in a substantially square edge which is rounded sufficiently to avoid being sharp. The rear face of the abutment member 21 is spherical and seats in a spherical socket 22 of a member 23 fixed on a side wall of the container 10.

As the tube T is drawn through the applicator 2 the tube expands slightly if necessary to pass over the head 20 and then contracts to pass through the central hole of the abutment 21, the contraction being implemented by the pull of the capstan 6 (FIG. 1c). It has been found that the tube passes freely over the head 20 and through the hole in the abutment 21 without binding or objectionable resistance. As the hole in the abutment member 21 is smaller than the head 20, the mandrel 15 is held against such pull as may result from frictional engagement of the tube with the mandrel. The arrangement shown thus maintains the mandrel in correct position. The ball-and-socket mounting of the abutment member 21 assures proper alignment and uniform distribution of forces acting through the tube wall to maintain the head 20 and hence the mandrel 15 in position.

FIG. 8 shows on an enlarged scale a preferred embodiment in which the head on the stem 19, instead of being integral as illustrated in FIG. 1a, comprises a removable washer 20a seating on a shoulder or abutment 20b. The rear face of the washer is flat with the outer corner edges rounded sufficiently to avoid sharpness. The outer diameter of the washer is slightly greater than the diameter of the opening in the abutment member so that the flat face of the washer 20a overlaps slightly the flat face of the abutment member 21. The washer 20a is formed of hard material to reduce wear and is readily replaceable. All surfaces engaged by the fabric tube T are smooth and polished to reduce friction.

After the adhesive is applied the tubing is passed through the oven 3, shown diagrammatically as an electric oven having heating elements 24, to drive off the solvent of the adhesive and to dry the adhesive. The heat applied may also cure the adhesive if an adhesive requiring curing is used. Since the internal mandrel is shaped to open up the tubing, so that it becomes round for example, and the adhesive is set during the drying or curing operation the tube is stiffened and tends to be held in a round condition by the adhesive.

The adhesive used is one suitable for bonding a rubber onto the tubing T. For example, an adhesive suitable for tubing made of glass fibers is the adhesive known by the trade name "Chemlok" 607 manufactured by Lord Manufacturing Company. This adhesive is a solution of vinyl silane in methanol and is treated in the oven 3 at a temperature of about 600° F. Other suitable silane adhesives may likewise be used.

In some instances, depending upon the type of coating composition to be applied to the fabric tube and the material used in the fabric tube, the use of a preliminary adhesive coating on the fabric tube may be eliminated. All that is necessary is to provide the desired bond between the coating composition and the fabric tube. Accordingly, where the coating composition will properly adhere to the tube without the use of the adhesive, the adhesive may be eliminated.

The extruder 4 comprises (FIG. 1b) an extruder cross head 25 having a stepped axial bore 26 in which there is mounted an extruding die assembly comprising a guider or bushing 27 and a die 28, both of which are held in place by a threaded collar or nut 29. The guider 27 and die 28 are provided with aligned axial holes through which the tube T passes. As described more fully in my copending application, Serial No. 776,378, filed November 25, 1958, the die 28 has an inwardly projecting portion 28a which fits closely into a recess in the guider 27 to center the die assembly with respect to the guider. The axial holes in the guider 27 and die 28 are thereby accurately aligned.

The extruder cross head 25 is hinged at 30 to a cylinder 31 and is held tightly against the lower head of the cylinder by suitable fastening means, for example, bolts (not shown). The cylinder 31 contains a feed screw 32 which is rotated to force plastic material downwardly under high pressure, for example, 3000 pounds per square inch, through a breaker plate 33 and radial passage 34 into the axial bore 26 of the extruder cross head 25. From the bore 26 the plastic flows through a plurality of angularly spaced axialy extending holes 36 in the guider 27 to an annular tapered space 37 formed between the guider 27 and the die 28 and leading into the die opening. The plastic is thus extruded onto the tube T as it is drawn through the extruder cross head.

In order to keep the tube T from being collapsed from the pressure of the plastic or rubber P being extruded onto it there is provided (FIGS. 1b and 9) internally of the guider an inner elongated bushing 40 forming a die member for constricting a length of the tubing radially inwardly in a zone ahead of the tapered space 37. The die 40 has a flange 40a seating on a corresponding shoulder internally of the guider precluding movement in a direction toward the travel of the tube T. A sleeve 41 is threaded into the guider 27 and holds the die member 40 seated on a corresponding shoulder of the guider. The sleeve 41 fits axially into a second sleeve 43 threaded onto a liner 44 having a tapered end portion 44a defining the bore 26 jointly with the cross head 25. The opposite end of liner 44 carries a threaded lock nut 45 bearing on a front face of an externally threaded bushing 46 which is threaded onto cross head 25 and has a flange bearing on the front face of the cross head 25. The extruder can be easily disassembled for cleaning and for ease of assembly after cleaning the liner 45 has a guide pin 44b guided in a slot 25a of the cross head 25 so that the tube T passes therethrough coaxial with the openings of the guider 27 and die 28.

The member 40 has an internal diameter dimensioned to constrict the sleeving T an amount substantially equal to the thickness of the wall of the sleeving or tubing T. The tubing prior to entering member 40 has the fabric fibers arranged in the wall thereof loosely spaced in the manner shown in FIG. 2. Large air spaces exist between the fibers. When the tubing is constricted the fibers are compacted so that the density of the material is increased in the manner diagrammatically shown in FIG. 3.

The size of the guider axial hole is determined by the member 40 and is made within a limit of dimensions. The axial hole preferably should be made with the maximum and minimum range to preclude collapsing of the sleeving due to the pressure of the rubber being extruded thereon as a coating. If the inner diameter of the die 40 is too small the die might collapse the sleeving. If the inner diameter of member 40 is too large the rubber might collapse the tubing or sleeving. The range of the preferable inside diameters of the member 40 for a sleeving T formed of loosely braided fiber glass are shown as a plot in FIG. 10. In the curves shown in FIG. 10 the inside diameters (I.D.) of various braided sleeving when extended is shown on the horizontal axis with the preferable range of dimensions that the hole must be less than the sleeving inside diameter shown on the vertical axis. In the curves the minimum size of the guider hole that will allow extrusion on the sleeving without collapsing or folding is equal to I.D.—Δmax. The maximum size of the guider hole that will allow extrusion of a rubber on the sleeving without collapsing or excessive eccentricity of the extrusion or eccentricity of wall dimensions of the coating is equal to I.D. —Δ min.

The guider 27 and die 28 have respective surfaces 27a and 28b disposed at an angle relative to the longitudinal axis of the extruder.

The surfaces 27a preferably form an angle within the range 25°–35°, and the surfaces 28b form an angle preferably within the range 30°–40°, with the axis to carry out the formation of an optimum nozzle for extrusion of the rubber onto the fabric sleeving. The end portion of the die member 40 opposite to the flange 40a has tapered surfaces 40b which merge smoothly with the surface 27a and terminate past a plane corresponding to the rear face of the guider. The guider holds die member 40 and die 28 accurately centered. The guider and inner die member 40 and attached sleeve or bushing 43 as well as the die 28 are removed from the extruder cross head for easy cleaning, for example, at the end of a run, by unscrewing the nut 29.

The sleeve remains compacted and in a constricted condition for a short distance as it leaves member 40 and expands only slightly as it comes out of die 40. The extrusion point is about .010″ to about .040″ beyond the die 40 which constricts the braided tubing. The axial hole of the die 28 is larger than the axial hole of the guider by approximately the wall thickness of the glass tubing plus the desired wall thickness of rubber.

From the extruding head 25 the tube T, with an extruded coating of plastic on it passes through the curing chamber 5 which is illustrated schematically in the drawing (FIG. 1b) as an oven having electrical heating elements 50. The curing chamber 5 is of sufficient length to provide for the curing of the plastic covering of the tube during passage of the tube through the chamber.

The tube T is drawn through the extruder 4 and the curing chamber 5 by a capstan 6 which is illustrated schematically as comprising guide pulleys 53, 54 and 55 and traction pulleys 56 and 57, one or both of which are driven, preferably by a variable speed motor or through a variable speed drive (not shown). From the capstan 6 the tube passes to a take-up mechanism which is illustrated schematically as comprising a take-up reel 7.

In a preferred embodiment, the process and apparatus in accordance with the invention further provides for continuously testing the dielectric strength of the tube wall. As illustrated schematically in the drawing, the testing is effected by a spark tester 60 comprising a box or casing 61 having a removable cover 62 from which are suspended a multiplicity of bead chains 63, at least the cover and thread chains being formed of electrical conducting material. The tube T after being cured in the curing chamber 5 passes through the testing unit, holes 64 being provided in the opposite ends of the casing 61 for that purpose. The bead chains 63 drape themselves over the tube as it passes through the testing unit. A trough 65 which is V-shaped in cross section causes the chains 63 to converge beneath the tube so that substantially all portions of the tube are engaged by one or more of the bead chains. An inner electrode 66 is connected by a link, chain or wire 67 to the inner die member or mandrel 15. The connecting link 67 extends inside the tube and is electrically conductive so that the inner electrode 66 is connected to the inner die 22 both mechanically and electrically.

An electrical test circuit shown schematically as comprising a variable voltage source 69 controlled by a switch 70, a relay 71 and a connecting conductor 72 has one lead 73 connected to the outer electrode of the testing unit comprising the cover 62 and depending bead chains 63. Another lead 74 is electrically connected to the inner electrode 66 by means of one or more rotating wheels 75, each having on its periphery a multiplicity of sharp points 76 which penetrate the wall of the fabric tube T and contact or substantially contact an extended shank portion 77 which is preferably integral with the stem portion 19 of the mandrel and extends forwardly from the head 20. A head 78 is preferably provided on the forward end of the shank portion 77. By having two wheels 75 on opposite sides of the shank 77 the forces acting on the shank are substantially balanced. The stem portion 19, inner die or mandrel 15 and connecting link 67 provide an electrical connection between the shank portion 77 and the inner electrode 66.

With the arrangement shown, a voltage of selected value is applied to the wall of the tube T as it passes between the inner electrode 66 and the outer electrode comprising bead chains 63. If there is any weak spot in the tube wall, a resulting flow of current produces a signal which actuates the relay 71. The signal is used as desired, for example, to produce an audible or visual indication. For example, as illustrated in FIG. 1c, the signal of the spark tester is utilized to actuate a marking device 80 which may, for example, comprise a nozzle 81 connected to a suitable source of compressed air and paint (not shown) or other marking material. The nozzle is controlled by an electrically operated valve 82. The valve 82 is connected to and controlled by the test circuit. In order to take into account the time required for passage of a particular point on the tube from the spark tester 60 to the marking device 80 there is preferably provided a delay circuit or device 84 in the connections 85, 86 between the marking device and the relay 71 of the testing circuit. Any defective portion of the tube is thereby automatically marked as it passes the marking unit 80. The voltage applied between the inner and outer electrodes of the testing may be alternating, pulsating or direct current as desired.

The process and apparatus in accordance with the present invention makes it possible to produce supported tubing or sleeving at a high rate of speed, for example, 5 to 200 feet per minute. Uniform thickness of the tube wall through out its circumference and length is assured by the accurate centering of the inner and outer die members. The quality of the product is further assured by the testing device which automatically marks any defective portion.

The supported sleeve or tubing in accordance with the present invention represents an important improvement over tubing heretofore available, for example, that produced by a dipping method as described above. By reason of its being applied under pressure, the rubber coating is integrated with the fabric tube and is dense, uniform and free of pin holes such as those that frequently result from the evaporation of solvents from a coating applied by dipping. Moreover, it is possible by extrusion to utilize certain silicone rubbers and other plastics that cannot satisfactorily be thinned sufficiently to be used in a dipping process without impairing their strength, durability, electrical insulating properties or other characteristics. The present invention also makes it possible to produce supported tubing having cross sectional shapes not heretofore obtainable. A few such shapes are illustrated by way of example in FIGS. 10 and 11.

It has been found that with the improved process, rubber can be extruded onto the braided glass sleeve at high pressures, for example, 5000 pounds per square inch without collapsing the tubing. A strong bond is obtained between the glass tubing and the rubber. Moreover, the tubing is expansible and can be expanded to approximately twice its diameter without cracking. The new process is applicable to a wide range of sizes from, for example, 1/32 of an inch to 1 inch diameter. However, because of the expansibility of the tubing, it is not necessary to have as many different sizes in stock since the size of sleeving can be used for insulation on several sizes of wire.

FIG. 11 shows tubing 90 comprising a fabric tube 91 and a covering 92 formed of plastic material. The inner surface of the tubing is substantially cylindrical while the outer surface is fluted with a plurality of longitudinally extending ribs or ridges 93 separated by intervening valleys.

In FIG. 12 there is shown tubing 95 which is substantially D-shaped in cross section and comprises a fabric tube 96 and an outer covering 97 of plastic material. The cross sectional shape and wall thickness of the supported tubing in accordance with the invention can be selected as desired by the selection of corresponding cross sectional shape of the inner mandrel, the wiper, the various die members and the extruding opening in the outer die member 28. As illustrated particularly in FIGS. 11 and 12 cross sectional shape of the fabric tube portion need not be the same. In each instance the die member 28 is accurately positioned by the guider 27, so as to obtain either a uniform wall thickness throughout the circumferential extent of the tube or a wall having selected portions thicker than others as desired. In contrast with tubing produced by the dipping process referred to above, which can have only an approximate and uncontrolled circular cross section, the tubing in accordance with the present invention may have an unlimited variety of non-circular cross sectional shapes.

While preferred embodiments of the invention have been shown and described in the application, it will be understood that the invention is in no way limited to these particular embodiments and that modifications may be made within the scope of the appended claims.

What I claim and desire to secure by Letters Patent is:

1. Apparatus for coating a supple fabric tube with plastic material comprising, an extruder comprising a die having an aperture, means for advancing the tube longitudinally through said die aperture, means for feeding plastic material in a plastic state to said extruder to be extruded on said tube as it advances through said die and means for constricting radially inwardly immediately successive lengths of the tube at least in a zone substantially immediately ahead of said aperture thereby to compact and rigidify the tube in preparation for extruding the plastic material thereon without need of internal support of the tube and to avoid collapse of the tube during extrusion of the plastic material onto the constricted tube.

2. Apparatus for coating a supple fabric tube with plastic material comprising, an extruder comprising a die having an aperture, means for advancing the tube longitudinally through said die aperture, means for feeding plastic material in a plastic state to said extruder to be extruded on said tube as it advances through said die, means for constricting radially inwardly immediately successive lengths of the tube at least in a zone substantially immediately ahead of said aperture thereby to compact and rigidify the tube in preparation for extruding the plastic material thereon without need of internal support of the tube and to avoid collapse of the tube during extrusion of the plastic material onto the constricted tube, and means to treat the advancing tubing with a bonding agent prior to extruding the plastic on the tube to improve the bonding of the plastic thereon.

3. Apparatus for coating a supple fabric tube with plastic material comprising, an extruder comprising a die having an aperture, means for advancing the tube longitudinally through said die aperture, means for feeding plastic material in a plastic state to said extruder to be extruded on said tube as it advances through said die, means for constricting radially inwardly immediately successive lengths of the tube at least in a zone substantially immediately ahead of said aperture thereby to compact and rigidify the tube in preparation for extruding the plastic material thereon without need of internal support of the tube and to avoid collapse of the tube during extrusion of the plastic material onto the constricted tube, and means to set the plastic extruded on the tube without interruption of the travel of the remaining lengths of the tube through the extruder.

4. Apparatus for coating a supple fabric tube with plastic material comprising, an extruder comprising a die having an aperture, means for advancing the tube longitudinally through said die aperture, means for feeding plastic material in a plastic state to said extruder to be extruded on said tube as it advances through said die, means for constricting radially inwardly immediately successive lengths of the tube at least in a zone substantially immediately ahead of said aperture thereby to compact and rigidify the tube in preparation for extruding the plastic material thereon without need of internal support of the tube and to avoid collapse of the tube during extrusion of the plastic material onto the constricted tube, means to treat the advancing tubing with a bonding agent prior to extruding the plastic on the tube to improve the bonding of the plastic thereon, and means to set the plastic extruded on the tube without interruption of the travel of the remaining lengths of the tube through the extruder.

5. Apparatus for coating a supple fabric tube with plastic material comprising, an extruder comprising a die having an aperture, means for advancing the tube longitudinally through said die aperture, means for feeding plastic material in a plastic state to said extruder to be extruded on said tube as it advances through said die, means for constricting radially inwardly immediately successive lengths of the tube at least in a zone substantially immediately ahead of said aperture thereby to compact and rigidify the tube in preparation for extruding the plastic material thereon without need of internal support of the tube and to avoid collapse of the tube during extrusion of the plastic material onto the constricted tube, and means to test the dielectric strength of the tube subsequent to extruding plastic thereon without interruption of the travel of the tube.

6. A method of making a fabric reinforced plastic tube which comprises, providing a continuous, supple fabric tube, advancing the tube longitudinally in a substantially opened condition, constricting the tube radially inwardly in a selected zone to reduce its diameter along immediately successive lengths of equal length as the tube is advanced through said zone thereby to compact and rigidify the tube, extruding cover material under pressure in a plastic condition onto said fabric tube immediately as it leaves the constricting zone and without internal support of the tube, thereby to coat the tube while in a rigidified condition to avoid collapse of said tube by the pressure of said cover material.

7. A method of making a fabric reinforced plastic tube which comprises, providing a continuous, supple fabric tube, advancing the tube longitudinally in a substantially opened condition, constricting the tube radially inwardly in a selected zone to reduce its diameter along immediately successive lengths of equal length as the tube is advanced through said zone thereby to compact and rigidify the tube, extruding cover material under pressure in a plastic condition onto said fabric tube immediately as it leaves the constricting zone and without internal support of the tube, thereby to coat the tube while in a rigidified condition to avoid collapse of said tube by the pressure of said cover material, and setting the extruded plastic cover material on said tube.

8. A method of making a fabric reinforced plastic tube which comprises, providing a continuous, supple fabric tube, advancing the tube longitudinally in a substantially opened condition, applying an adhesive on the tube as it is advanced, constricting the tube radially inwardly in a selected zone to reduce its diameter along immediately successive lengths of equal length as the tube is advanced through said zone thereby to compact and rigidify the tube, extruding cover material under pressure in a plastic condition onto said fabric tube immediately as it leaves the constricting zone and without internal support of the tube, thereby to coat the tube while in a rigidified condition to avoid collapse of said tube by the pressure of said cover material.

9. A method of making a fabric reinforced plastic tube which comprises, providing a continuous, supple fabric tube, advancing the tube longitudinally in a substantially opened condition, constricting the tube in a selected zone to reduce its diameter along immediately successive lengths of equal length as the tube is advanced through said zone thereby to compact and rigidify the tube, extruding cover material under pressure in a plastic condition onto said fabric tube immediately as it leaves the constricting zone and without support of the tube, thereby to coat the tube while in a rigidified condition to avoid collapse of said tube by the pressure of said plastic cover material and testing the dielectric strength of the tube and the extruded cover material on said tube.

10. Apparatus for coating a supple fabric tube with plastic material comprising; a first die member having a die aperture extending therethrough, said die aperture in said first die member having a predetermined diameter smaller than the external diameter of the fabric tube, a second die member spaced from said first die member and having a die aperture therein, said die aperture in said second die member being co-axial with the die aperture in said first die member and having a predetermined diameter greater than the diameter of the die aperture in said first die member, means to advance said tube longitudinally through said first and second die apertures with the tube being radially compressed at said first die aperture and thereafter pulled through said second die aperture, means defining a chamber surrounding said first die member and terminating at the space between said first die member and said second die member, and means to force the plastic material into and through said chamber and through the space between said first and second die members and extrude the material onto said tube as the tube leaves the die aperture in said first die member in its radially compressed condition.

References Cited in the file of this patent
UNITED STATES PATENTS

| | | |
|---|---|---|
| 730,845 | Traylor | June 9, 1903 |
| 924,782 | Hoppe | June 15, 1909 |
| 1,499,533 | Katzenmeyer | July 1, 1924 |
| 1,681,566 | Anderegg | Aug. 21, 1928 |
| 1,986,696 | Wilson | Jan. 1, 1935 |
| 2,471,752 | Ingmanson | May 31, 1949 |
| 2,602,959 | Fenlin | July 15, 1952 |
| 2,760,230 | Van Riper | Aug. 28, 1956 |
| 2,874,411 | Berquist | Feb. 24, 1959 |
| 2,990,577 | Kraffe de Laubarede | July 4, 1961 |